United States Patent
Kwon et al.

(10) Patent No.: US 11,923,918 B2
(45) Date of Patent: Mar. 5, 2024

(54) SYSTEM AND METHOD FOR MULTI-ANTENNA COMMUNICATIONS

(71) Applicant: Huawei Technologies Co., Ltd., Shenzhen (CN)

(72) Inventors: Young Hoon Kwon, Laguna Niguel, CA (US); Pengfei Xia, San Diego, CA (US)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 396 days.

(21) Appl. No.: 17/257,748

(22) PCT Filed: Feb. 21, 2019

(86) PCT No.: PCT/CN2019/075721
§ 371 (c)(1),
(2) Date: Jan. 4, 2021

(87) PCT Pub. No.: WO2020/019706
PCT Pub. Date: Jan. 30, 2020

(65) Prior Publication Data
US 2021/0175935 A1  Jun. 10, 2021

Related U.S. Application Data

(60) Provisional application No. 62/796,669, filed on Jan. 25, 2019, provisional application No. 62/711,240, filed on Jul. 27, 2018.

(51) Int. Cl.
*H04B 7/0413* (2017.01)
(52) U.S. Cl.
CPC .................. *H04B 7/0413* (2013.01)

(58) Field of Classification Search
CPC .................. H04B 7/0413; H04W 72/0446
See application file for complete search history.

(56) References Cited

U.S. PATENT DOCUMENTS

| | | |
|---|---|---|
| 8,811,426 B1 | 8/2014 | Banerjea |
| 9,877,278 B2 | 1/2018 | Sartori et al. |

(Continued)

FOREIGN PATENT DOCUMENTS

| | | |
|---|---|---|
| CN | 101835263 A | 9/2010 |
| CN | 102291208 A | 12/2011 |

(Continued)

OTHER PUBLICATIONS

Intel Corporation, "MIMO layer adaption and control signaling overhead reduction," 3GPP TSG RAN WG1 Meeting #88, Agenda Item 8.1.2.1.1, R1-1702189, Athens, Greece, Feb. 13-17, 2017, 3 pages.

(Continued)

*Primary Examiner* — Rahel Guarino
(74) *Attorney, Agent, or Firm* — Slater Matsil, LLP

(57) ABSTRACT

A computer-implemented method for operating an access node includes receiving from a user equipment (UE), information on a maximum number of multiple input multiple output (MIMO) layers supported by the UE for an operation bandwidth within a system bandwidth operated by the access node, scheduling for the UE, a bandwidth in accordance with the maximum number of MIMO layers supported by the UE, sending to the UE, allocation information related to the bandwidth, and communicating with the UE, a data frame on the bandwidth.

32 Claims, 10 Drawing Sheets

(56) References Cited

U.S. PATENT DOCUMENTS

| | | | |
|---|---|---|---|
| 10,674,550 B2 | 6/2020 | Kim et al. | |
| 10,715,286 B2 | 7/2020 | Chen et al. | |
| 11,234,119 B2 | 1/2022 | Tenny et al. | |
| 2013/0039332 A1 | 2/2013 | Nazar et al. | |
| 2018/0191413 A1* | 7/2018 | Suzuki | H04W 72/23 |

FOREIGN PATENT DOCUMENTS

| | | |
|---|---|---|
| CN | 102388659 A | 3/2012 |
| CN | 103329458 A | 9/2013 |
| CN | 103493392 A | 1/2014 |
| CN | 107438967 A | 12/2017 |
| CN | 107534933 A | 1/2018 |
| CN | 107925490 A | 4/2018 |
| CN | 108141332 A | 6/2018 |
| CN | 108235414 A | 6/2018 |
| EP | 2333996 A1 | 6/2011 |
| WO | WO2018084971 | * 11/2018 |

OTHER PUBLICATIONS

Huawei et al., "Discussion on NR UE baseband capability signaling," 3GPP TSG-RAN WG4 Meeting #86, Agenda Item 7.9.11, R4-1801672, Athens, Greece, Feb. 26-Mar. 2, 2018, 3 pages.

Huawei, "Flexible CA/MIMO configuration and related CA/MIMO capabilities information," 3GPP TSG RAN WG4 Meeting Ad hoc 2010#3, R4-102612, Bratislava, Slovakia, Jun. 28-Jul. 2, 2010, 4 pages.

Hisilicon, et al., "Further discussion on UE categories and capabilities," 3GPP TSG-RAN WG4 Meeting Ad Hoc #4, R4-103607, Xi'an, China, Oct. 11-15, 2010, 5 pages.

* cited by examiner

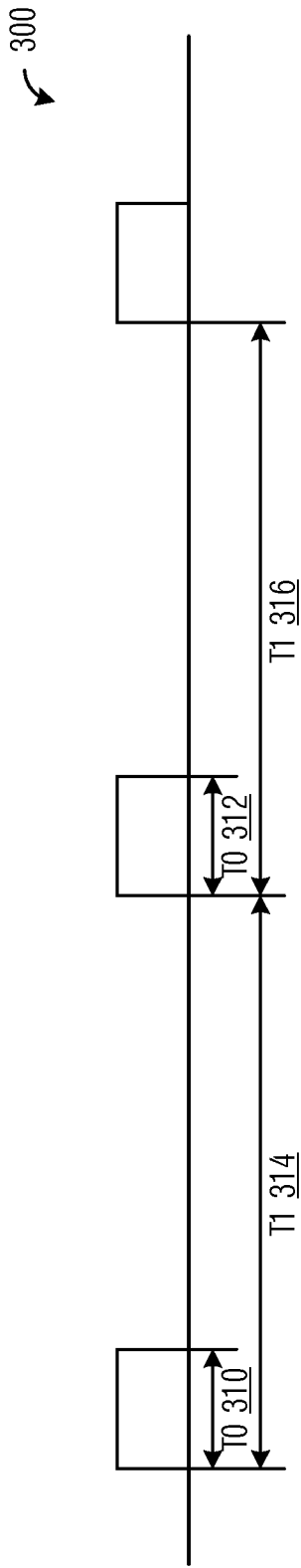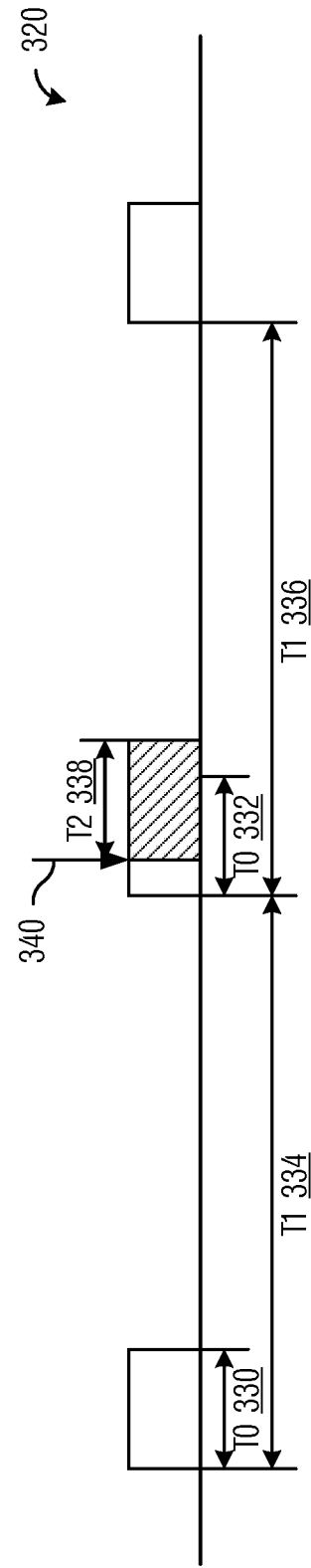

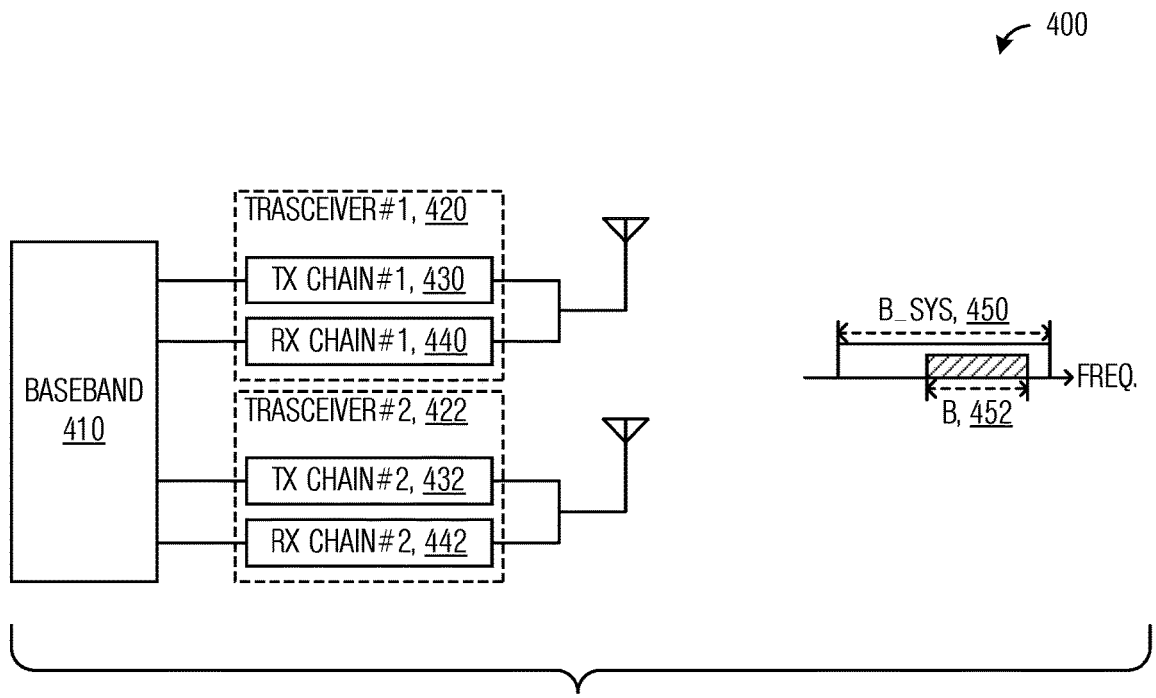
*Fig. 4*
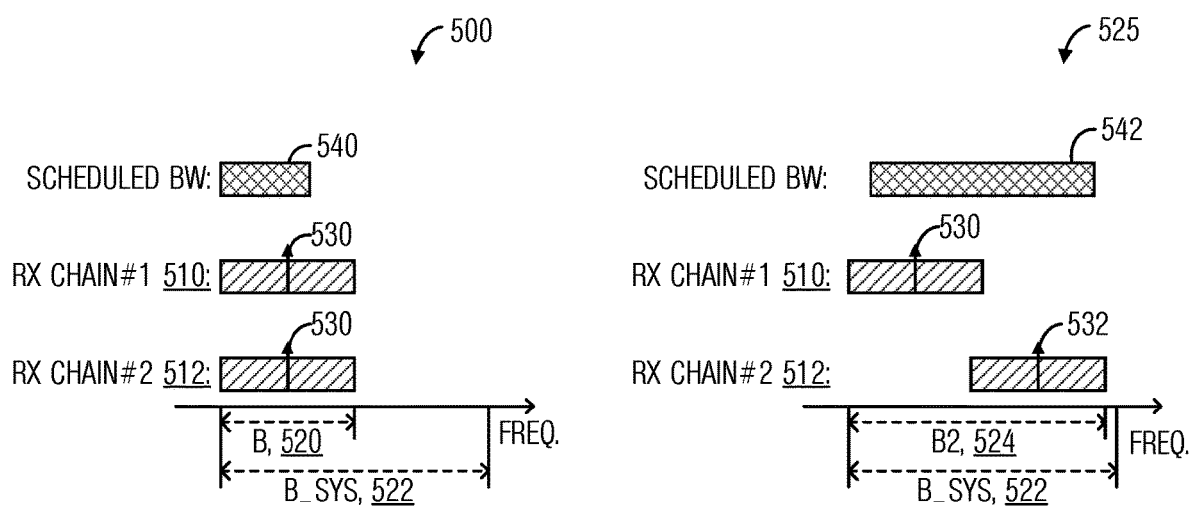
*Fig. 5A*  *Fig. 5B*

SYSTEM AND METHOD FOR MULTI-ANTENNA COMMUNICATIONS

This patent application is a national phase filing under section 371 of PCT/CN2019/075721 filed Feb. 21, 2019 and entitled "Apparatus and Method for Multi-Antenna Communications," which claims the benefit of U.S. Provisional Application No. 62/711,240, filed on Jul. 27, 2018, entitled "Apparatus and Method for Multi-Antenna Communications," and claims the benefit of U.S. Provisional Application No. 62/796,669, filed on Jan. 25, 2019, entitled "System and Method for Multi-Antenna Communications," both of which applications are hereby incorporated herein by reference in their entireties.

TECHNICAL FIELD

The present disclosure relates generally to a system and method for digital communications, and, in particular embodiments, to a system and method for multi-antenna communications.

BACKGROUND

Modern communications systems, especially those with high path loss (such as those operating at millimeter wavelength frequencies and above), use multiple radio frequency (RF) chains and beamforming to improve communications system performance. Beamformed communications use precoding to shape transmit or receive beams to increase signal gain. However, use of multiple RF chains and beamformed communications may increase the complexity of communications and power consumption by requiring additional communications overhead to determine which precoders to use at the transmitting device or the receiving device to maximize performance.

SUMMARY

According to a first aspect, a computer-implemented method for operating an access node is provided. The method includes receiving, by the access node, from a user equipment (UE), information on a maximum number of multiple input multiple output (MIMO) layers supported by the UE for an operation bandwidth within a system bandwidth operated by the access node, scheduling, by the access node, for the UE, a bandwidth in accordance with the maximum number of MIMO layers supported by the UE, sending, by the access node, to the UE, allocation information related to the bandwidth, and communicating, by the access node, with the UE, a data frame on the bandwidth.

In a first implementation form of the computer-implemented method according to the first aspect as such, wherein the information is received in a message.

In a second implementation form of the computer-implemented method according to the first aspect as such or any preceding implementation form of the first aspect, further comprising negotiating, by the access node, with the UE to determine the maximum number of MIMO layers.

In a third implementation form of the computer-implemented method according to the first aspect as such or any preceding implementation form of the first aspect, wherein the operation bandwidth is a bandwidth part (BWP).

In a fourth implementation form of the computer-implemented method according to the first aspect as such or any preceding implementation form of the first aspect, wherein the operation bandwidth is a component carrier.

In a fifth implementation form of the computer-implemented method according to the first aspect as such or any preceding implementation form of the first aspect, further comprising configuring, by the access node, a maximum number of MIMO layers for the operation bandwidth in accordance with the maximum number of MIMO layers supported by the UE for the operation bandwidth.

In a sixth implementation form of the computer-implemented method according to the first aspect as such or any preceding implementation form of the first aspect, wherein the maximum number of MIMO layers for the operation bandwidth is less than or equal to the maximum number of MIMO layers supported by the UE for the operation bandwidth.

According to a second aspect, a computer-implemented method for operating a UE is provided. The method includes receiving, by the UE, from an access node, an allocation information for a first bandwidth, configuring, by the UE, RF chains of the UE in accordance with the first bandwidth, a second bandwidth supported by each RF chain, a maximum number of MIMO layers supported by the UE for a first operation bandwidth within a system bandwidth that the access node operates, and the first operation bandwidth, and communicating, by the UE, with the access node, a data frame on the first bandwidth using the configured RF chains.

In a first implementation form of the computer-implemented method according to the second aspect as such, further comprising indicating, by the UE, first information on the maximum number of MIMO layers supported by the UE for the first operation bandwidth.

In a second implementation form of the computer-implemented method according to the second aspect as such or any preceding implementation form of the second aspect, wherein indicating the first information comprises sending, by the UE, a message including the first information.

In a third implementation form of the computer-implemented method according to the second aspect as such or any preceding implementation form of the second aspect, wherein indicating the first information comprises negotiating, by the UE, with the access node to determine the maximum number of MIMO layers.

In a fourth implementation form of the computer-implemented method according to the second aspect as such or any preceding implementation form of the second aspect, wherein configuring the RF chains comprises determining, by the UE, that the first bandwidth is less than or equal to the second bandwidth, and based thereon, configuring at least two RF chains with the same center frequency, with each RF chain spanning the first bandwidth.

In a fifth implementation form of the computer-implemented method according to the second aspect as such or any preceding implementation form of the second aspect, wherein configuring the RF chains comprises determining, by the UE, that the first bandwidth is greater than the second bandwidth, and based thereon, configuring at least two RF chains with different center frequencies, wherein a combined bandwidth of the at least two RF chains spans the first bandwidth.

In a sixth implementation form of the computer-implemented method according to the second aspect as such or any preceding implementation form of the second aspect, wherein configuring the RF chains comprises determining, by the UE, that the second bandwidth is less than the first operation bandwidth, and based thereon, configuring at least two RF chains with different center frequencies, wherein a combined bandwidth of the at least two RF chains spans the first operation bandwidth.

In a seventh implementation form of the computer-implemented method according to the second aspect as such or any preceding implementation form of the second aspect, further comprising indicating, by the UE, second information on a maximum number of MIMO layers for a second operation bandwidth is one.

In an eighth implementation form of the computer-implemented method according to the second aspect as such or any preceding implementation form of the second aspect, wherein configuring the RF chains comprises determining, by the UE, that the first operation bandwidth and the second operation bandwidth are the same equal, and based thereon, configuring, by the UE, one RF chain.

In a ninth implementation form of the computer-implemented method according to the second aspect as such or any preceding implementation form of the second aspect, wherein configuring the RF chains comprises determining, by the UE, that the first operation bandwidth and the second operation bandwidth are different operation bandwidths, and based thereon, configuring the RF chains in accordance with the first bandwidth, the second bandwidth, the second operation bandwidth, and the maximum number of MIMO layers.

In a tenth implementation form of the computer-implemented method according to the second aspect as such or any preceding implementation form of the second aspect, further comprising monitoring, by the UE, for a control channel in the second operation bandwidth using the one RF chain.

In an eleventh implementation form of the computer-implemented method according to the second aspect as such or any preceding implementation form of the second aspect, wherein indicating the first information comprises negotiating, by the UE, with the access node to schedule only single MIMO layer communications in the first operation bandwidth.

According to a third aspect, an access node is provided. The access node includes a non-transitory memory storage comprising instructions, and one or more processors in communication with the memory storage. The one or more processors execute the instructions to receive from a UE, information on a maximum number of MIMO layers supported by the UE for an operation bandwidth within a system bandwidth operated by the access node, schedule for the UE, a bandwidth in accordance with the maximum number of MIMO layers supported by the UE, send to the UE, allocation information related to the bandwidth, and communicate with the UE, a data frame on the bandwidth.

In a first implementation form of the access node according to the third aspect as such, wherein the information is received in a message.

In a second implementation form of the access node according to the third aspect as such or any preceding implementation form of the third aspect, wherein the one or more processors further execute the instructions to negotiate with the UE to determine the maximum number of MIMO layers.

In a third implementation form of the access node according to the third aspect as such or any preceding implementation form of the third aspect, wherein the operation bandwidth is a BWP.

In a fourth implementation form of the access node according to the third aspect as such or any preceding implementation form of the third aspect, wherein the operation bandwidth is a component carrier.

In a fifth implementation form of the access node according to the third aspect as such or any preceding implementation form of the third aspect, wherein the one or more processors further execute the instructions to configure a maximum number of MIMO layers for the operation bandwidth in accordance with the maximum number of MIMO layers supported by the UE for the operation bandwidth.

In a sixth implementation form of the access node according to the third aspect as such or any preceding implementation form of the third aspect, wherein the maximum number of MIMO layers for the operation bandwidth is less than or equal to the maximum number of MIMO layers supported by the UE for the operation bandwidth.

According to a fourth aspect, a UE is provided. The UE includes a non-transitory memory storage comprising instructions, and one or more processors in communication with the memory storage. The one or more processors execute the instructions to receive from an access node, an allocation information for a first bandwidth, configure RF chains of the UE in accordance with the first bandwidth, a second bandwidth supported by each RF chain, a maximum number of MIMO layers supported by the UE for a first operation bandwidth within a system bandwidth that the access node operates, and the first operation bandwidth, and communicate with the access node, a data frame on the first bandwidth using the configured RF chains.

In a first implementation form of the UE according to the fourth aspect as such, wherein the one or more processors further execute the instructions to indicate first information on the maximum number of MIMO layers supported by the UE for the first operation bandwidth.

In a second implementation form of the UE according to the fourth aspect as such or any preceding implementation form of the fourth aspect, wherein the one or more processors further execute the instructions to send a message including the first information.

In a third implementation form of the UE according to the fourth aspect as such or any preceding implementation form of the fourth aspect, wherein the one or more processors further execute the instructions to negotiate with the access node to determine the maximum number of MIMO layers.

In a fourth implementation form of the UE according to the fourth aspect as such or any preceding implementation form of the fourth aspect, wherein the one or more processors further execute the instructions to determine that the first bandwidth is less than or equal to the second bandwidth, and based thereon, configure at least two RF chains with the same center frequency, with each RF chain spanning the first bandwidth.

In a fifth implementation form of the UE according to the fourth aspect as such or any preceding implementation form of the fourth aspect, wherein the one or more processors further execute the instructions to determine that the first bandwidth is greater than the second bandwidth, and based thereon, configure at least two RF chains with different center frequencies, wherein a combined bandwidth of the at least two RF chains spans the first bandwidth.

In a sixth implementation form of the UE according to the fourth aspect as such or any preceding implementation form of the fourth aspect, wherein the one or more processors further execute the instructions to determine that the second bandwidth is less than the first operation bandwidth, and based thereon, configure at least two RF chains with different center frequencies, wherein a combined bandwidth of the at least two RF chains spans the first operation bandwidth.

In a seventh implementation form of the UE according to the fourth aspect as such or any preceding implementation form of the fourth aspect, wherein the one or more processors further execute the instructions to indicate second information on a maximum number of MIMO layers for a second operation bandwidth is one.

In an eighth implementation form of the UE according to the fourth aspect as such or any preceding implementation form of the fourth aspect, wherein the one or more processors further execute the instructions to determine that the first operation bandwidth and the second operation bandwidth are the same equal, and based thereon, configure one RF chain.

In a ninth implementation form of the UE according to the fourth aspect as such or any preceding implementation form of the fourth aspect, wherein the one or more processors further execute the instructions to determine that the first operation bandwidth and the second operation bandwidth are different operation bandwidths, and based thereon, configure the RF chains in accordance with the first bandwidth, the second bandwidth, the second operation bandwidth, and the maximum number of MIMO layers.

In a tenth implementation form of the UE according to the fourth aspect as such or any preceding implementation form of the fourth aspect, wherein the one or more processors further execute the instructions to monitor for a control channel in the second operation bandwidth using the one RF chain.

In an eleventh implementation form of the UE according to the fourth aspect as such or any preceding implementation form of the fourth aspect, wherein the one or more processors further execute the instructions to negotiate with the access node to schedule only single MIMO layer communications in the first operation bandwidth.

An advantage of a preferred embodiment is that the power consumption associated with communicating over wide bandwidth operation bandwidths with multiple radio frequency chains is reduced, thereby reducing the overall power consumption of a communications device.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 3A and 3B illustrate an example of DRX operation;

FIG. 4 illustrates a UE having multiple transceivers;

FIGS. 5A and 5B illustrate a UE operation of receiving downlink frame from the UE according to example embodiments described herein;

DETAILED DESCRIPTION OF ILLUSTRATIVE EMBODIMENTS

The making and using of the disclosed embodiments are discussed in detail below. It should be appreciated, however, that the present disclosure provides many applicable concepts that can be embodied in a wide variety of specific contexts. The specific embodiments discussed are merely illustrative of specific ways to make and use the embodiments, and do not limit the scope of the disclosure.

Figure 1:
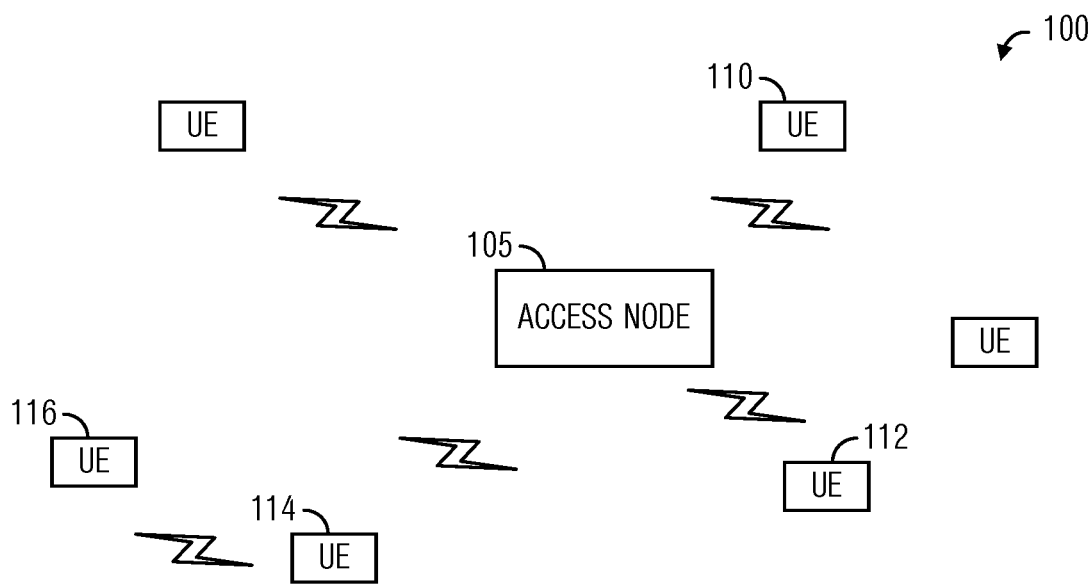
FIG. 1 illustrates an example wireless communications system.

FIG. 1 illustrates an example communications system 100. Communications system 100 includes an access node 105 serving a plurality of user equipments (UEs), including UEs 110, 112, 114, and 116. In a first operating mode, communications to and from a UE that is served by access node 105, pass through access node 105. In a second operating mode, UEs can communicate directly with one another without having access node 105 serving as an intermediary, however, access node 105 typically allocates resources used by UE 115 to communicate. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), Wi-Fi 802.11a/b/g/n/ac/ad/ax/ay, etc. While it is understood that communications systems may employ multiple eNBs capable of communicating with a number of UEs, only one eNB and multiple UEs are illustrated for simplicity.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals and/or receive uplink signals.

Figure 2:
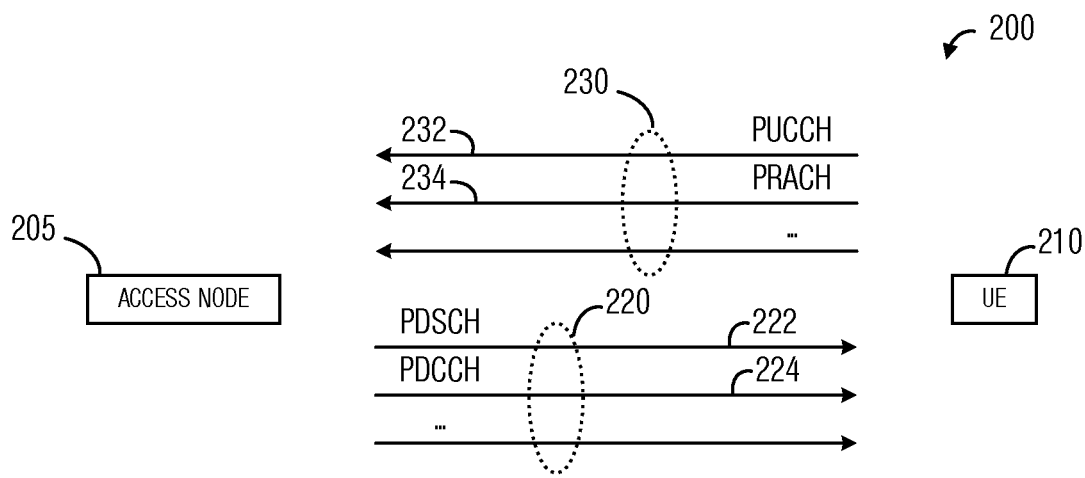
FIG. 2 illustrates a communications system highlighting an example channel structure between an access node and a UE.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232 and a physical random access channel (PRACH) 234 among others. Other channels may be present in downlink channel 220 or uplink channel 230 but are not shown in FIG. 2.

Typically, communications in a communications system involves a first device transmitting to a second device, which receives the transmission. Therefore, in downlink communications, an access node transmits a transmission to a UE and the UE receives the transmission from the access node. In uplink communications, a UE transmits a transmission to an access node and the access node receives the transmission from the UE.

Modern communications systems such as New Radio (NR) standard that is being developed by the Third Generation Partnership Project (3GPP) use multiple stream transmissions for both downlink and uplink. These NR standards are hereby referred to herein as 3GPP NR. To support multiple stream transmissions, a UE needs to support multiple transceiver chains for RX path (for downlink) or for transmit (TX) path (for uplink) or for both TX and RX paths. However, use of multiple transceiver chains (either TX path or RX path) increases UE's power consumption compared to single transceiver chain operation. In terms of UE's power consumption, it is well known that each transceiver chain consumes almost separate power and only small amount of power is shared among multiple transceiver chains in ordinary UE implementation. Therefore, modern UE's power consumption is expected to be much higher than that of previous generation UEs.

During the standardization activities of 3GPP NR, a Discontinuous Reception (DRX) operation is determined for saving power consumption from UE side. The basic media access control (MAC) layer operation for DRX utilizes the following parameters:

drx-onDurationTimer: the duration at the beginning of a DRX Cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX Cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity.

When a DRX cycle is configured, the Active Time includes the time while:

drx-onDurationTimer or drx-InactivityTimer or drx-RetransmissionTimerDL or drx-RetransmissionTimerUL or ra-ContentionResolutionTimer (as described in subclause 5.1.5 of 3GPP TS 38.421 V15.4.0, which is hereby incorporated herein by reference) is running; or a Scheduling Request is sent on PUCCH and is pending (as described in subclause 5.4.4 of 3GPP TS 38.421 V15.4.0, which is hereby incorporated herein by reference); or a PDCCH indicating a new transmission addressed to the C-RNTI of the MAC entity has not been received after successful reception of a Random Access Response for the Random Access Preamble not selected by the MAC entity among the contention-based Random Access Preamble (as described in subclause 5.1.4, which is hereby incorporated herein by reference).

When DRX is configured, the MAC entity may:

1> if a MAC PDU is received in a configured downlink assignment:

2> start the drx-HARQ-RTT-TimerDL for the corresponding HARQ process in the first symbol after the end of the corresponding transmission carrying the DL HARQ feedback;

2> stop the drx-RetransmissionTimerDL for the corresponding HARQ process.

1> if a MAC PDU is transmitted in a configured uplink grant:

2> start the drx-HARQ-RTT-TimerUL for the corresponding HARQ process in the first symbol after the first repetition of the corresponding PUSCH transmission;

2> stop the drx-RetransmissionTimerUL for the corresponding HARQ process.

1> if a drx-HARQ-RTT-TimerDL expires:

2> if the data of the corresponding HARQ process was not successfully decoded:

3> start the drx-RetransmissionTimerDL for the corresponding HARQ process in the first symbol after the expiry of drx-HARQ-RTT-TimerDL.

1> if a drx-HARQ-RTT-TimerUL expires:

2> start the drx-RetransmissionTimerUL for the corresponding HARQ process in the first symbol after the expiry of drx-HARQ-RTT-TimerUL.

1> if a DRX Command MAC CE or a Long DRX Command MAC CE is received:

2> stop drx-onDurationTimer;

2> stop drx-InactivityTimer.

1> if drx-InactivityTimer expires or a DRX Command MAC CE is received:

2> if the Short DRX cycle is configured:

3> start or restart drx-ShortCycleTimer in the first symbol after the expiry of drx-InactivityTimer or in the first symbol after the end of DRX Command MAC CE reception;

3> use the Short DRX Cycle.

2>else:

3> use the Long DRX cycle.

1> if drx-ShortCycleTimer expires:

2> use the Long DRX cycle.

1> if a Long DRX Command MAC CE is received:

2> stop drx-ShortCycleTimer;

2> use the Long DRX cycle.

1> if the Short DRX Cycle is used, and [(SFN×10)+subframe number]modulo (drx-ShortCycle)=(drx-StartOffset) modulo (drx-ShortCycle); or 1> if the Long DRX Cycle is used, and [(SFN×10)+subframe number]modulo (drx-LongCycle)=drx-StartOffset:

2> start drx-onDurationTimer after drx-SlotOffset from the beginning of the subframe.

1> if the MAC entity is in Active Time:
2> monitor the PDCCH;
2> if the PDCCH indicates a DL transmission:
3> start the drx-HARQ-RTT-TimerDL for the corresponding HARQ process in the first symbol after the end of the corresponding transmission carrying the DL HARQ feedback;
3> stop the drx-RetransmissionTimerDL for the corresponding HARQ process.
2> if the PDCCH indicates a UL transmission:
3> start the drx-HARQ-RTT-TimerUL for the corresponding HARQ process in the first symbol after the end of the first repetition of the corresponding PUSCH transmission;
3> stop the drx-RetransmissionTimerUL for the corresponding HARQ process.
2> if the PDCCH indicates a new transmission (DL or UL):
3> start or restart drx-InactivityTimer in the first symbol after the end of the PDCCH reception.
1> in current symbol n, if the MAC entity would not be in Active Time considering grants/assignments/DRX Command MAC CE/Long DRX Command MAC CE received and Scheduling Request sent 4 ms prior to symbol n when evaluating all DRX Active Time conditions as specified in this subclause:
2> not transmit periodic SRS and semi-persistent SRS defined in 3GPP TS 38.214.
1> if CSI masking (cqi-Mask) is setup by upper layers:
2> in current symbol n, if onDurationTimer would not be running considering grants/assignments/DRX Command MAC CE/Long DRX Command MAC CE received 4 ms prior to symbol n when evaluating all DRX Active Time conditions as specified in this subclause:
3> not report CSI on PUCCH.
1> else:
2> in current symbol n, if the MAC entity would not be in Active Time considering grants/assignments/DRX Command MAC CE/Long DRX Command MAC CE received and Scheduling Request sent 4 ms prior to symbol n when evaluating all DRX Active Time conditions as specified in this subclause:
3> not report CSI on PUCCH and semi-persistent CSI on PUSCH.

FIGS. 3A and 3B illustrate diagrams 300 and 320 of a first example of DRX operation based on the above mentioned MAC procedure. A UE switches its state between DRX ON state and DRX OFF state. When the UE is in DRX ON state, the UE monitors a wireless channel for frame exchange. However, when the UE is in DRX OFF state, the UE is not required to monitor the wireless channel based on the assumption that a serving base station will not initiate data transmission during the DRX OFF state. FIG. 3A illustrates a case where only a Long DRX Cycle (drx-Long Cycle) is configured and the serving base station does not send a PDCCH during DRX ON duration. For each DRX cycle T1 314-316, the UE monitors PDCCH during T0 310-312 until drx-onDuration Timer expires. After T0 310-312 when drx-onDurationTimer expires, the UE goes to DRX OFF state again and is not monitoring the wireless medium. Therefore, during Long DRX cycle T1 314-316, the UE only monitors the wireless medium during T0 310-312, which can save power consumption in the UE side.

FIG. 3B illustrates a case where only a Long DRX Cycle (drx-LongCycle) is configured and the serving base station sends a PDCCH during DRX ON duration. For each DRX cycle T1 334-336, the UE monitors PDCCH during T0 330-332 until drx-onDuration Timer expires. If a PDCCH 340 is detected before drx-onDurationTimer expires, the UE monitors the wireless medium further during T2 338 until another timer (drx-InactivityTimer) expires to check any follow up DL transmission. When drx-InactivityTimer expires and there's no follow up data exchange, then the UE goes to DRX OFF state again and is not monitoring the wireless medium.

It is noted that a RX chain or a RX path in this disclosure implies a RF chain for a RX path or a RF and a digital circuit related to a RX path interchangeably. Similarly, it needs to be noted that a TX chain or a TX path in this disclosure implies a RF chain for a TX path or a RF and a digital circuit related to a TX path interchangeably.

A UE can occupy only a subset of a system bandwidth based on bandwidth part (BWP) operation in 3GPP NR standard. A BWP is a subset of contiguous common resource blocks in 3GPP NR standard for a given numerology on a given carrier (system bandwidth). A BWP can be defined by a starting position and the number of resource blocks that forms the BWP within the given carrier, for example. A UE can be configured with multiple BWPs in downlink and also in uplink. Moreover, the UE is not expected to receive PDSCH, PDCCH, or CSI-RS outside an active downlink BWP. If a UE is configured with a supplementary uplink, the UE can in addition be configured with multiple BWPs in the supplementary uplink with a single supplementary uplink BWP being active at a given time. The UE shall not transmit PUSCH or PUCCH outside an active BWP. For an active cell, the UE shall not transmit SRS outside an active BWP.

FIG. 4 illustrates a diagram 400 of a UE having multiple transceivers. In this example, the UE has two transceivers (420 and 422) connected to a baseband unit 410. And, each transceiver 420 or 422 is composed of a TX chain (430 or 432) and an RX chain (440 or 442). Each of the transceiver can operate on bandwidth B 452. As the UE has two RX chains 440 and 442, the UE can receive 2 layers of MIMO streams simultaneously (i.e., the UE receives a rank 2 transmission from a serving gNB). Similarly, as the UE has two TX chains 430 and 432, the UE can transmit 2 layers of MIMO streams simultaneously (i.e., a rank 2 transmission from the UE). And, these 2 layer MIMO transmissions can occupy up to the operation bandwidth of B 452. In this example, even though the operation bandwidth equals to B 452, the system bandwidth B_sys 450 that the gNB supports can be greater than B 452, and the gNB only allocates downlink or uplink transmissions within bandwidth of B 452.

As the UE supports bandwidth B 452 within the system bandwidth B_sys 450, both transceiver chains can support its bandwidth up to B 452. As the supported bandwidth B 452 becomes larger, the power consumption for the UE also increases because the power consumption is proportional to the occupied bandwidth. Moreover, to support larger bandwidth, each component of the transceiver needs to support larger bandwidth, which cause increase of the component cost. Meanwhile, the chance of both transceiver chains being used for wide bandwidth is not high. This is mainly because scheduling of higher rank transmission (either uplink or downlink) requires high signal quality, and thus, it requires high transmission power to schedule a traffic with rank 2 transmission on wide bandwidth to have high signal quality for the wide bandwidth unless the UE is located close to the gNB. Therefore, unless the UE is located close to the gNB, due to transmission power limitation, the chance of higher rank transmission on wide bandwidth is not good. This implies that in most of the times, the bandwidth of the scheduled downlink or uplink transmission for the UE is far narrower than the bandwidth that the UE's transceiver can support, or the transmission rank of the scheduled downlink or uplink transmission for the UE is less than the number of layers that the UE can support.

According to an example embodiment, a UE indicates different UE capability regarding a maximum number of MIMO layers depending on supported bandwidth. In one embodiment, the maximum number of MIMO layers the UE supports is N1 for a first bandwidth and the maximum number of MIMO layers the UE supports is N2 for a second bandwidth, wherein N1 is greater than N2 and the first bandwidth is smaller than the second bandwidth. In general, the UE indicating its UE capability may involve the UE sending information (in a message, for example) regarding its UE capability to another device or negotiating with the other device to determine and share its UE capability. As an example, a UE sends information (in a message, for example) about its UE capability to its serving gNB. As another example, a UE and its serving gNB exchange information (in messages, for example) about the UE's capability to determine and share information about the UE's capability. As yet another example, a UE sends information (in a message, for example) about its UE capability pertaining to a feature to its serving gNB and the serving gNB configures the feature to meet the capability of the UE. Examples of features may include supported MIMO layers, supported bandwidth, maximum data rate or MCS rate, and so on.

In conventional solutions, a UE's capability on maximum number of MIMO layers are defined and indicated per each component carrier. In various embodiments, however, the maximum number of MIMO layers is defined per operation bandwidth or per BWP within a component carrier. Therefore, flexible operation for a UE is provided such that the UE can adaptively configure its TX chains or RX chains within a component carrier to save power consumption.

FIGS. 5A and 5B illustrate diagrams 500 and 525 of UE operation of receiving downlink frame from the UE according to example embodiments described herein. In this example, the UE has 2 RX chains (RX chain #1 510 and RX chain #2 512), and both RX chains support bandwidth of up to B 520. The UE is connected to a gNB whose system bandwidth is B_sys 522. The UE indicates to a serving gNB that the UE can support maximum of 2 MIMO layers if the operating bandwidth is less than B 520, and the UE can support maximum of 1 MIMO layer if the operating bandwidth is between B 520 and B2 524.

FIG. 5A shows an example where the gNB schedules a DL transmission whose scheduled bandwidth 540 is less than B 520. In this case, both RX chains of the UE are set to the same center frequency 530, where scheduled bandwidth 540 is spanned by a frequency range that is B 520 bandwidth wide and centered a center frequency 530. Thus both of RX chain #1 510 and RX chain #2 512 can cover the scheduled bandwidth 540. At each frequency-time resource within the scheduled bandwidth 540, the UE can have received signal from both RX chain #1 510 and RX chain #2 512. Therefore, the gNB can schedule downlink transmission with its MIMO layer up to 2 (or, rank 2 transmission).

FIG. 5B shows an example that the gNB schedules a DL transmission whose scheduled bandwidth 542 is greater than B 520 of FIG. 5A. As shown in FIG. 5B, scheduled bandwidth 542 has bandwidth that is greater than bandwidth B 520. In this case, the center frequency of RX chain #1 510 is set to 530 and the center frequency of RX chain #2 512 is set to 532 such that combined bandwidth of RX chain #1 510 and RX chain #2 512 centered at center frequencies 530 and 532, respectively, is greater than the scheduled bandwidth 542. The combined bandwidth of RX chain #1 510 and RX chain #2 512 is shown as bandwidth B2 524. At each frequency-time resource within the scheduled bandwidth 542, the UE can have received signal from (i) RX chain #1 510, (ii) RX chain #2 512, or (iii) both RX chain #1 510 and RX chain #2 512. Therefore, the gNB can schedule downlink transmission with its MIMO layer only up to 1 (or, rank 1 transmission).

According to an example embodiment, a UE indicates separate capability on a maximum number of MIMO layers depending on supported BWP. In one embodiment, the maximum number of MIMO layers the UE supports is N1 for a first BWP and the maximum number of MIMO layers the UE supports is N2 for a second BWP, wherein N1 and N2 can be different. As discussed previously, the UE indicating its UE capability may involve the UE sending information regarding its UE capability to another device or negotiating with the other device to determine and share its UE capability.

Figure 6A:
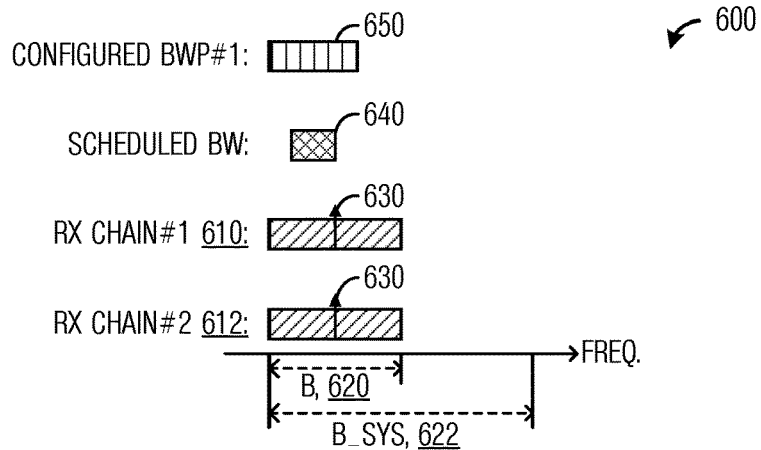
FIGS. 6A-6C illustrate a second UE operation of receiving downlink frame from the UE according to example embodiments described herein.
Figure 6B:
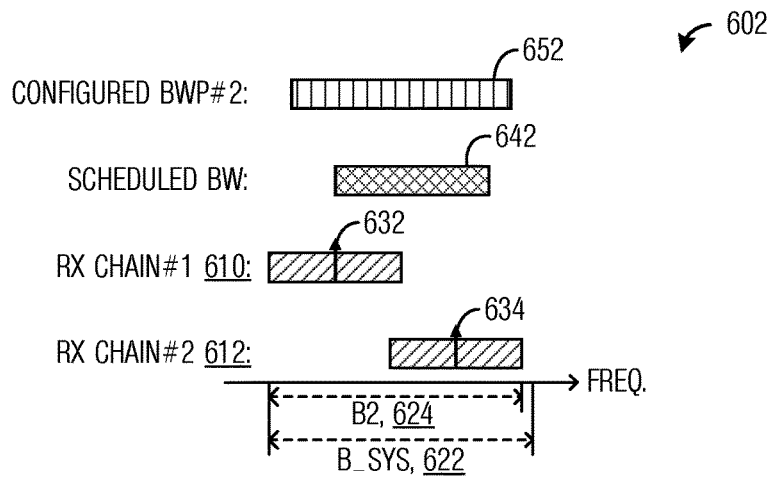
Figure 6C:
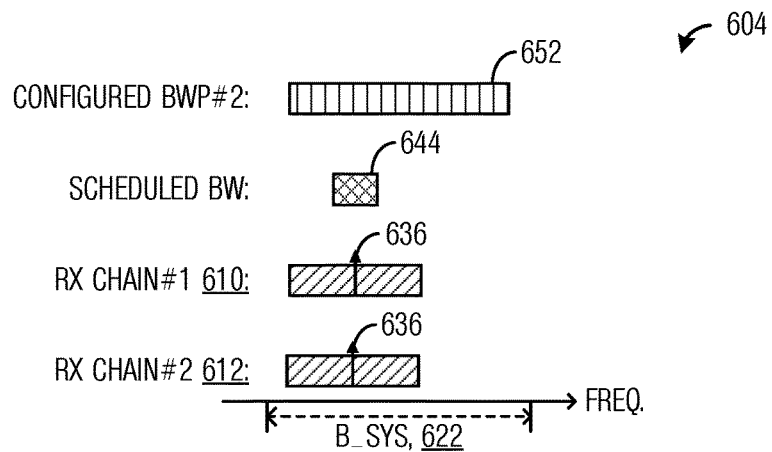

FIGS. 6A-6C illustrate diagrams 600, 602, and 604 of a second UE operation of receiving downlink frame from the UE according to example embodiments described herein. In this example, the UE has 2 RX chains (RX chain #1 610 and RX chain #2 612), and both RX chains support bandwidth of up to B 620. The UE is connected to a gNB whose system bandwidth is B_sys 622. The UE indicates to a serving gNB that the UE can support maximum of 2 MIMO layers if the UE operates in a configured BWP of BWP #1 650, and the UE can support maximum of 1 MIMO layer if the UE operates in a configured BWP of BWP #2 652.

FIG. 6A shows an example where the UE's active BWP is BWP #1 650 and the gNB schedules a DL transmission with a scheduled bandwidth 640. In this case, as the UE has indicated that the UE can support maximum of 2 MIMO layers in BWP #1, both RX chains of the UE are set to the same center frequency 630, and thus both of RX chain #1 610 and RX chain #2 612 can cover the configured BWP #1 650 which includes scheduled bandwidth 640. Therefore, the gNB can schedule downlink transmission with its MIMO layer up to 2 (or, rank 2 transmission).

FIG. 6B shows an example where the UE's active BWP is BWP #2 652 and the gNB schedules a DL transmission with a scheduled bandwidth 642. In this case, as the UE has indicated that the UE can support maximum of 1 MIMO layer in BWP #2, the center frequency of RX chain #1 610 is set to center frequency 632 and the center frequency of RX chain #2 612 is set to center frequency 634 such that combined bandwidth of RX chain #1 610 and RX chain #2 612, when centered at center frequencies 632 and 634, respectively, span bandwidth B2 624 and can cover the configured BWP #2 652, wherein the configured BWP #2 652 includes scheduled bandwidth 642. Therefore, the gNB can schedule downlink transmission with its MIMO layer set to 1 (or, rank 1 transmission).

FIG. 6C shows an example that the UE's active BWP is BWP #2 652 and the gNB schedules a DL transmission with a scheduled bandwidth 644. In this case, as the UE has indicated that the UE can support maximum of 1 MIMO layer in BWP #2 652, the gNB schedules downlink transmission with its MIMO layer only up to 1 (or, rank 1 transmission). However, as the scheduled bandwidth 644 is less than the bandwidth of RX chain #1 610 and RX chain #2 612, the UE sets the center frequency of both RX chain #1 610 and RX chain #2 612 to center frequency 636 such that both RX chain #1 610 and RX chain #2 612 cover the scheduled bandwidth 644. Therefore, the UE receives the scheduled downlink data with both RX chain #1 610 and RX chain #2 612.

According to an example embodiment, a UE indicates a first value as its capability regarding a maximum number of MIMO layers to a serving gNB. In addition, the UE further indicates a second value to the gNB, where the maximum number of MIMO layers for a first operation bandwidth is restricted to the second value, wherein the second value is smaller than the first value. In one embodiment, the first operation bandwidth is defined as a unit of BWP. In one embodiment, the first operation bandwidth is defined as a unit of component carrier.

According to an example embodiment, a UE indicates a first value as its capability regarding a maximum number of MIMO layers to a serving gNB. In addition, the gNB and the UE have an agreement that the the maximum number of MIMO layers is limited to a second value on a first BWP. Then, the UE operates in C-DRX mode wherein at the beginning of DRX ON duration, the UE monitors PDCCH on the first BWP, and wherein the gNB may schedule data transmission on the first BWP with the number of MIMO layers up to the second value. During the DRX ON duration, the gNB schedules data transmission on a second BWP which is different from the first BWP, wherein the gNB schedules frame with the number of MIMO layers up to the first value. If there's no more data transmission scheduled, the UE goes to DRX OFF state and the UE switches its active BWP from the second BWP to the first BWP if the gNB switched the active BWP of the UE from the first BWP to the second BWP. In an embodiment, the first value is greater than the second value. In an embodiment, the second value is set to 1. In one embodiment, the first BWP is a predetermined BWP (e.g., initial BWP or default BWP). In an example embodiment, the agreement can be made based on multiple bases:

on a gNB's indication of maximum number of MIMO layers for the first BWP;
on a gNB's indication of C-DRX mode operation;
on a UE's indication of the UE's capability on the maximum number of MIMO layers for the first BWP; or
on a standard defined way without explicit indication.

According to an example embodiment, a UE indicates its maximum number of MIMO layers for each BWP to a serving gNB, with exception to the maximum number of MIMO layers on a first BWP, which is limited to a second value. In other words, the maximum number of MIMO layers on a first BWP is the second value, while the maximum number of MIMO layers on other BWPs are potentially different first values. Then, the UE operates in C-DRX mode wherein at the beginning of DRX ON duration, the UE monitors PDCCH on the first BWP, and wherein the gNB may schedule data transmission on the first BWP with the number of MIMO layers up to the second value. During the DRX ON duration, the gNB schedules data transmission on a second BWP which is different from the first BWP, wherein the gNB schedules frame with the number of MIMO layers up to a first value associated with the second BWP. If there's no more data transmission scheduled, the UE goes to DRX OFF state and the UE switches its active BWP from the second BWP to the first BWP if the gNB switched the active BWP of the UE from the first BWP to the second BWP. In an embodiment, the first value is greater than the second value. In an embodiment, the second value is set to 1. In one embodiment, the first BWP is a predetermined BWP (e.g., initial BWP or default BWP). In one embodiment, the agreement can be made based on multiple bases:

on a gNB's indication of maximum number of MIMO layers for the first BWP;
on a gNB's indication of C-DRX mode operation;
on a UE's indication of the UE's capability on the maximum number of MIMO layers for the first BWP; or
on a standard defined way without explicit indication.

Figure 7:
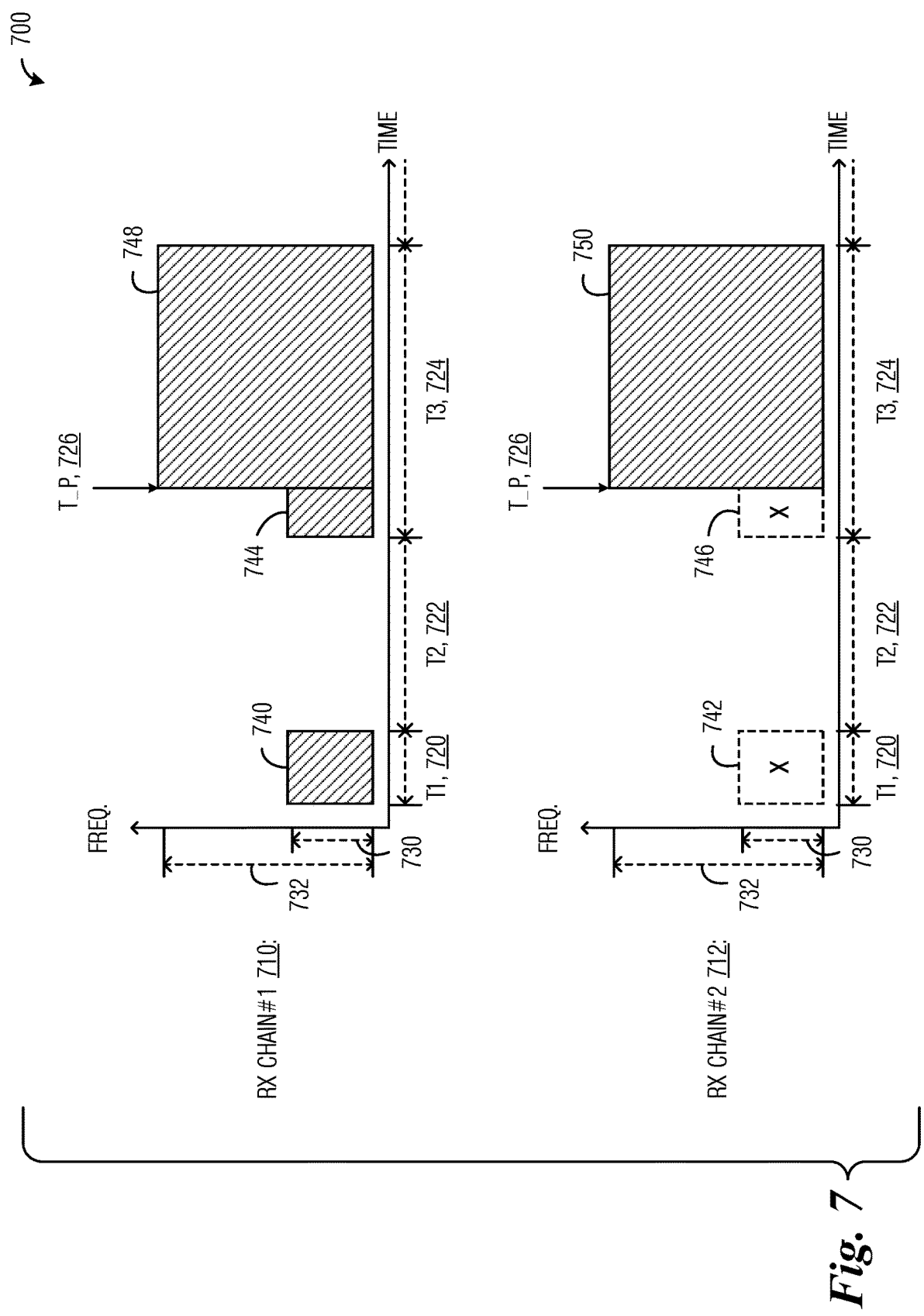
FIG. 7 illustrates a third UE operation of receiving downlink frame from the UE according to example embodiments described herein.

FIG. 7 illustrates a diagram 700 of a third UE operation of receiving downlink frame from the UE according to example embodiments described herein. In this example, the UE has 2 RX chains (RX chain #1 710 and RX chain #2 712). The UE indicates to a serving gNB that the UE can support maximum of 2 MIMO layers. The UE further indicates to the gNB that the maximum number of MIMO layers the UE supports is limited to 1 if active BWP is BWP #1 730. The UE operates in discontinuous reception (DRX) mode. Thus, the UE switches between DRX ON period (T1 720 and T3 724, for example) and DRX OFF period (T2 722, for example), and the UE monitors PDCCH only during DRX ON period. At the beginning of a DRX ON period T1 720, BWP #1 730 is configured as an active BWP for the UE. As the UE can support maximum of 1 MIMO layer in BWP #1 730, the gNB only transmits downlink frame with maximum of 1 MIMO layer (or, rank 1 transmission), and the UE only activates RX chain #1 710 (operation bandwidth 740) and RX chain #2 712 is not activated for reception (operation bandwidth 742) to save power consumption. Therefore, the operation bandwidth of RX chain #1 710 during time T1 720, operation bandwidth 740 covers BWP #1 730, and thus the UE can monitor PDCCH using RX chain #1.

In this example, there's no PDCCH received during T1 720. Therefore, the RX chain #2 712 was not activated during T1 720. After a DRX OFF period T2 722, at the beginning of following DRX ON period T3 724, BWP #1 730 also used as an active BWP for the UE. As the UE can support maximum of 1 MIMO layer in BWP #1 730, the gNB only transmits downlink frame with maximum of 1 MIMO layer (or, rank 1 transmission), and the UE only activates RX chain #1 710 (operation bandwidth 744) and RX chain #2 712 is not activated for reception (operation bandwidth 746) to save power consumption. At time T_P 726, the UE receives a PDCCH scheduling downlink data transmission from the gNB in BWP #2 732. As the UE can support maximum of 2 MIMO layers in BWP #2 732, the gNB schedules rank 2 transmission in BWP #2 732 during T3 724 period. After receiving the PDCCH at T_P 726, the UE activates both RX chain #1 710 with operation bandwidth 748 and RX chain #2 712 with operation bandwidth 750 in a way so that both RX chains can cover BWP #2 732. Therefore, the UE can receive rank 2 transmission from the gNB using both RX chain #1 710 and RX chain #2 712. At the end of DRX ON duration T3 724, the UE deactivates both RX chain #1 710 and RX chain #2 712 for power saving until next DRX ON duration. Although it is shown in FIG. 7 as occurring at substantially the same time as the scheduled rank 2 transmission in BWP #2 732, there may be a gap present between the reception of PDCCH at T_P 726 and the scheduled rank 2 transmission in BWP #2 732 to allow for a delay associated with the activation of RX chain #2 712.

Figure 8A:
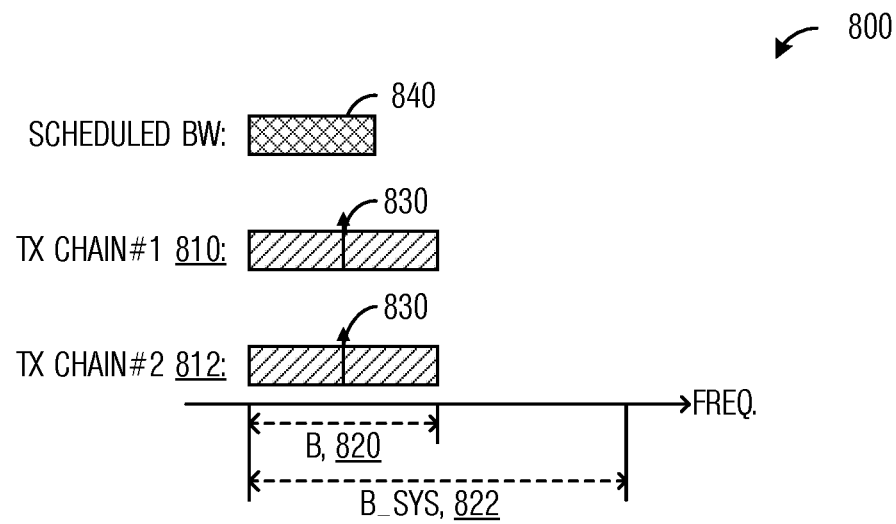
FIGS. 8A and 8B illustrate diagrams of UE operation of transmitting uplink frame from the UE accordingly.
Figure 8B:
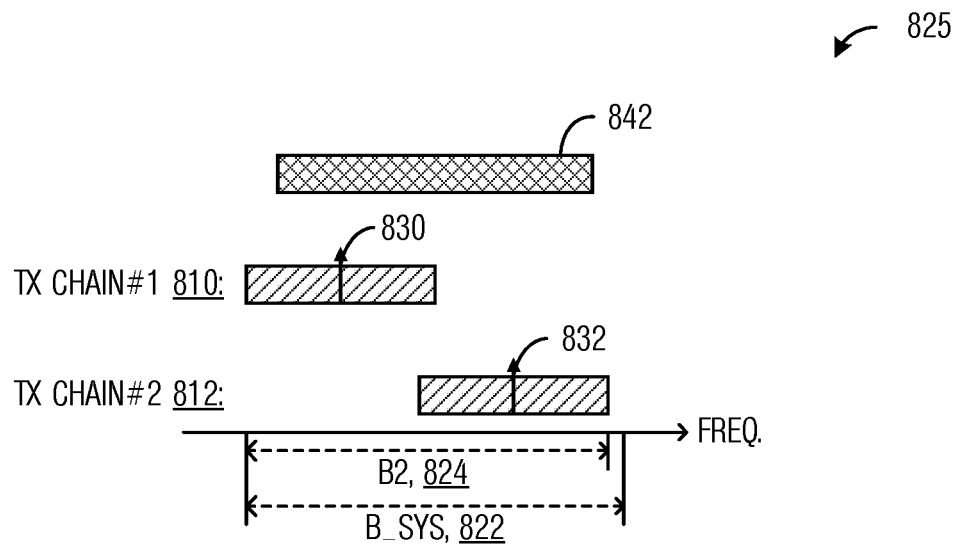

FIGS. 8A and 8B illustrate diagrams Boo and 825 of a UE operation of transmitting uplink frame from the UE according to example embodiments described herein. In this example, the UE has 2 TX chains (TX chain #1 810 and TX chain #2 812), and both TX chains support bandwidth of up to B 820. The UE is connected to a gNB whose system bandwidth is B_sys 822. The UE indicates to a serving gNB that the UE can support maximum of 2 MIMO layers if the operating bandwidth is less than B 820, and the UE can support maximum of 1 MIMO layers if the operating bandwidth is between B 820 and B2 824.

FIG. 8A shows an example that the gNB schedules a UL transmission whose scheduled bandwidth 840 is less than B 820. In this case, both TX chains of the UE is set to the same center frequency 830, and thus both of TX chain #1 810 and TX chain #2 812 can cover the scheduled bandwidth 840. At each frequency-time resource within the scheduled bandwidth 840, the UE can transmit signal from both TX chain #1 810 and TX chain #2 812. Therefore, the gNB can schedule uplink transmission with its MIMO layer up to 2 (or, rank 2 transmission).

FIG. 8B shows an example that the gNB schedules a UL transmission whose scheduled bandwidth 842 is less than B2 824 but more than B 820. In this case, the center frequency of TX chain #1 is set to 830 and the center frequency of TX chain #2 is set to 832 such that combined bandwidth of TX chain #1 810 and TX chain #2 812 is greater than the scheduled bandwidth 842. In other words, the bandwidths of TX chain #1 810 and TX chain #2 812 span scheduled bandwidth 842. At each frequency-time resource within the scheduled bandwidth 842, the UE can transmit signal from (i) TX chain #1 810, (ii) TX chain #2 812, or (iii) both TX chain #1 810 and TX chain #2 812. Therefore, the gNB can schedule uplink transmission with its MIMO layer only up to 1 (or, rank 1 transmission).

Figure 9:
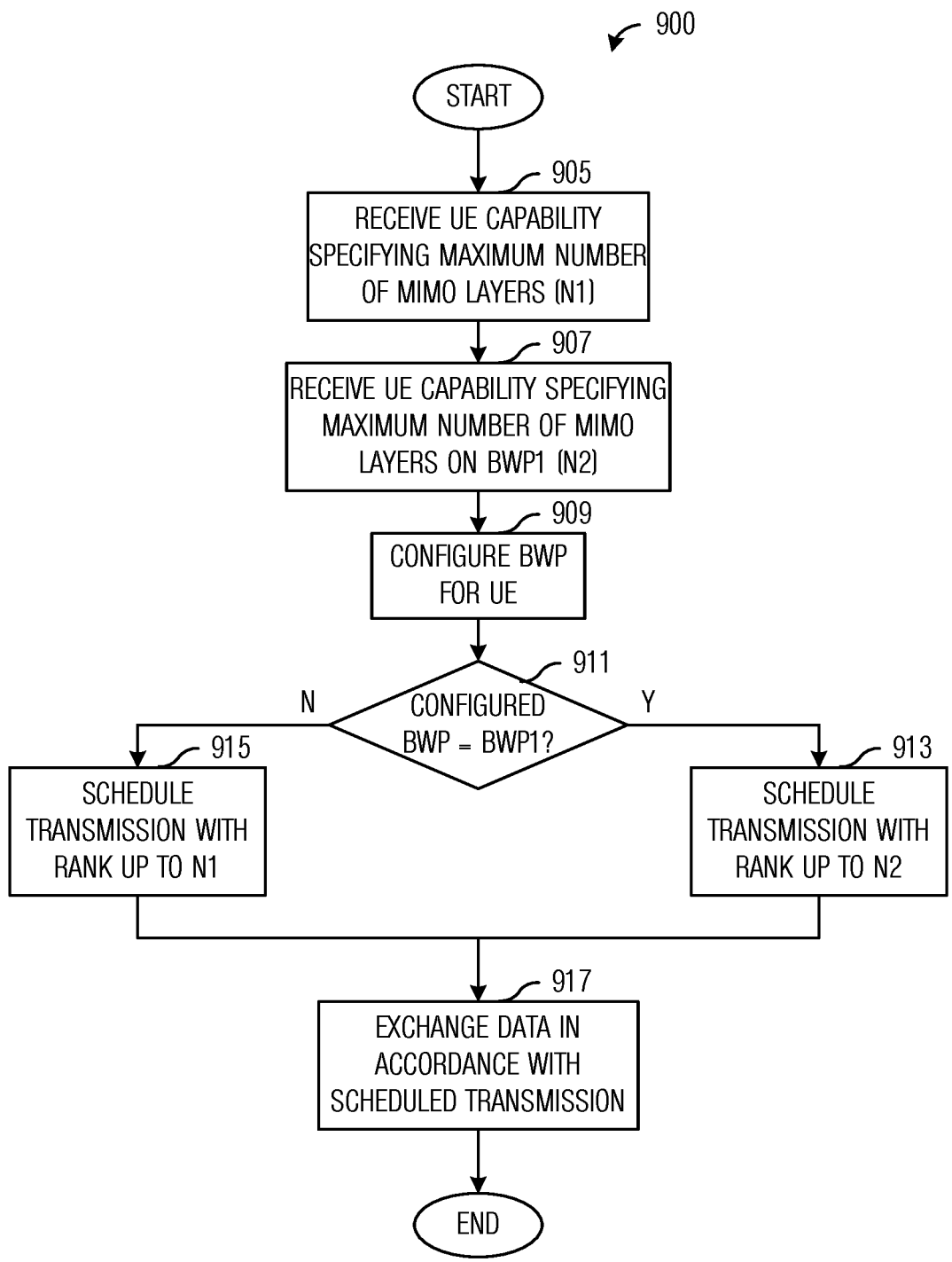
FIG. 9 illustrates a flow diagram of example operations occurring in a gNB scheduling a downlink frame accordingly.

FIG. 9 illustrates a flow diagram of example operations 900 occurring in a gNB scheduling a downlink frame accordingly. The gNB receives an information on the capability from a UE that the maximum number of MIMO layers for PDSCH equals to N1 (block 905). And, the gNB further receives another information on the capability from the UE that the maximum number of MIMO layers for PDSCH is restricted to N2 if configured active BWP equals to BWP1 (block 907). When the gNB configures a BWP as an active BWP (block 909), the gNB checks if the active BWP is BWP1 (block 911). If the active BWP is BWP1, the gNB schedules downlink data transmission with transmission rank limited to N2 (block 913). If the active BWP is not BWP1, the gNB schedules downlink data transmission with transmission rank limited to N1 (915). At the scheduled resource, the gNB transmits downlink data with the transmission rank determined based on previous blocks (block 917).

Figure 10:
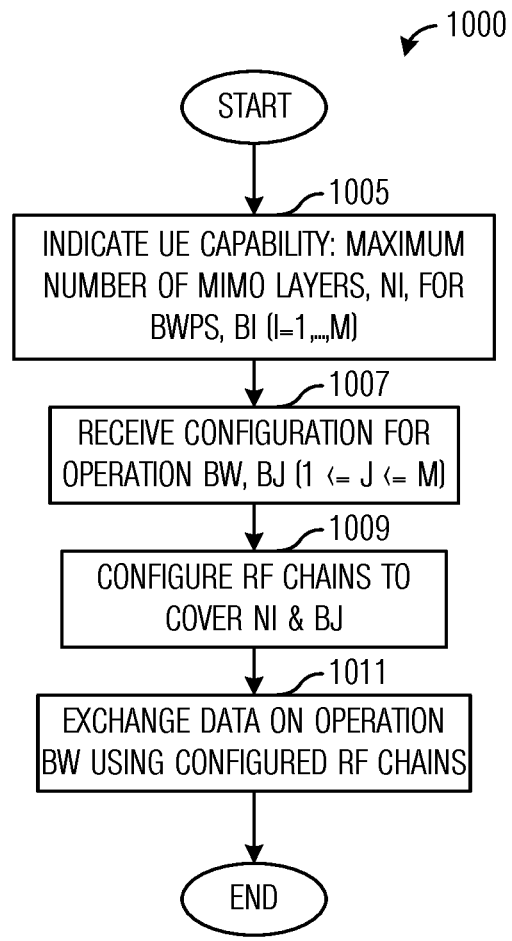
FIG. 10 illustrates a flow diagram of example operations occurring in a UE scheduled for downlink frame according to example embodiments described herein.

FIG. 10 illustrates a flow diagram of example operations 1000 occurring in a UE scheduled for downlink frame accordingly. The UE indicates an information on the capability that the maximum number of MIMO layers for PDSCH equals to Ni for operation bandwidth Bi where i=1, . . . , M (block 1005). The UE is configured to an operation bandwidth of Bj where $1 \leq j \leq M$ (block 1007). As the operation bandwidth is set to Bj, the UE configures its RX chains in a way that at least Nj RX chains can cover the operation bandwidth Bj simultaneously (block 1009). Then, the UE receives downlink data frames in the operation bandwidth Bj (block 1011).

It is noted that even though some of the example embodiments above explain the operation of RX chains for downlink transmission only, the similar mechanism can be applied to TX chains for uplink transmission from a UE without loss of generality.

Figure 11:
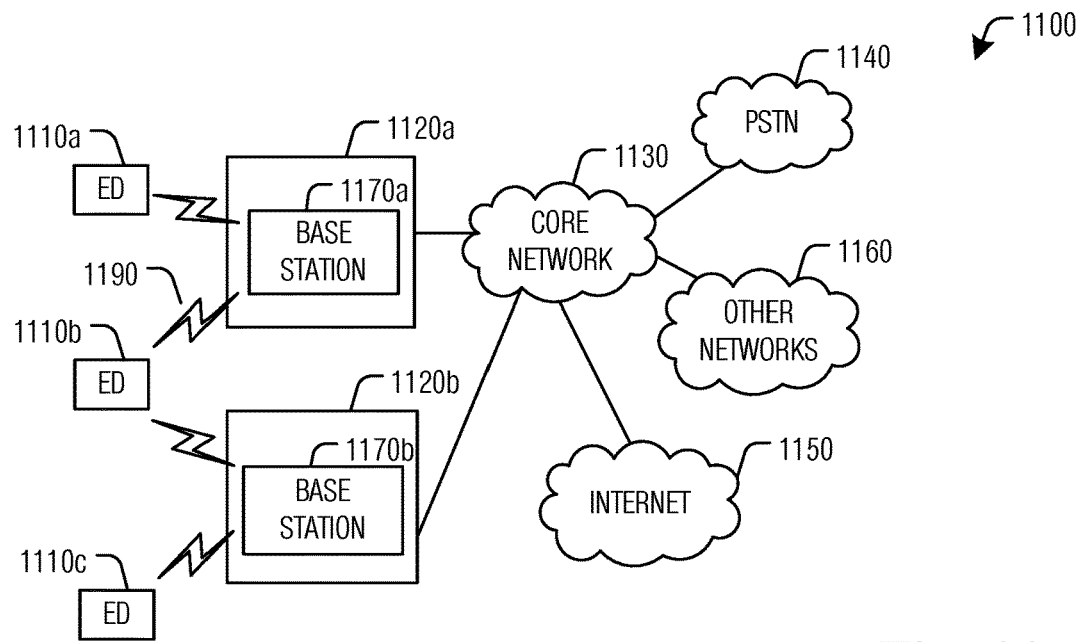
FIG. 11 illustrates an example communication system according to example embodiments described herein.

FIG. 11 illustrates an example communication system 1100. In general, the system 1100 enables multiple wireless or wired users to transmit and receive data and other content. The system 1100 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1100 includes electronic devices (ED) 1110a-1110c, radio access networks (RANs) 1120a-1120b, a core network 1130, a public switched telephone network (PSTN) 1140, the Internet 1150, and other networks 1160. While certain numbers of these components or elements are shown in FIG. 11, any number of these components or elements may be included in the system 1100.

The EDs 1110a-1110c are configured to operate or communicate in the system 1100. For example, the EDs 1110a-1110c are configured to transmit or receive via wireless or wired communication channels. Each ED 1110a-1110c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1120a-1120b here include base stations 1170a-1170b, respectively. Each base station 1170a-1170b is configured to wirelessly interface with one or more of the EDs 1110a-1110c to enable access to the core network 1130, the PSTN 1140, the Internet 1150, or the other networks 1160. For example, the base stations 1170a-1170b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1110a-1110c are configured to interface and communicate with the Internet 1150 and may access the core network 1130, the PSTN 1140, or the other networks 1160.

In the embodiment shown in FIG. 11, the base station 1170a forms part of the RAN 1120a, which may include other base stations, elements, or devices. Also, the base station 1170b forms part of the RAN 1120b, which may include other base stations, elements, or devices. Each base station 1170a-1170b operates to transmit or receive wireless signals within a particular geographic region or area, sometimes referred to as a "cell." In some embodiments, multiple-input multiple-output (MIMO) technology may be employed having multiple transceivers for each cell.

The base stations 1170a-1170b communicate with one or more of the EDs 1110a-1110c over one or more air interfaces 1190 using wireless communication links. The air interfaces 1190 may utilize any suitable radio access technology.

It is contemplated that the system 1100 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1120a-1120b are in communication with the core network 1130 to provide the EDs 1110a-1110c with voice, data, application, Voice over Internet Protocol (VoIP), or other services. Understandably, the RANs 1120a-1120b or the core network 1130 may be in direct or indirect communication with one or more other RANs (not shown). The core network 1130 may also serve as a gateway access for other networks (such as the PSTN 1140, the Internet 1150, and the other networks 1160). In addition, some or all of the EDs 1110a-1110c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1150.

Although FIG. 11 illustrates one example of a communication system, various changes may be made to FIG. 11. For example, the communication system 1100 could include any number of EDs, base stations, networks, or other components in any suitable configuration.

Figure 12A:
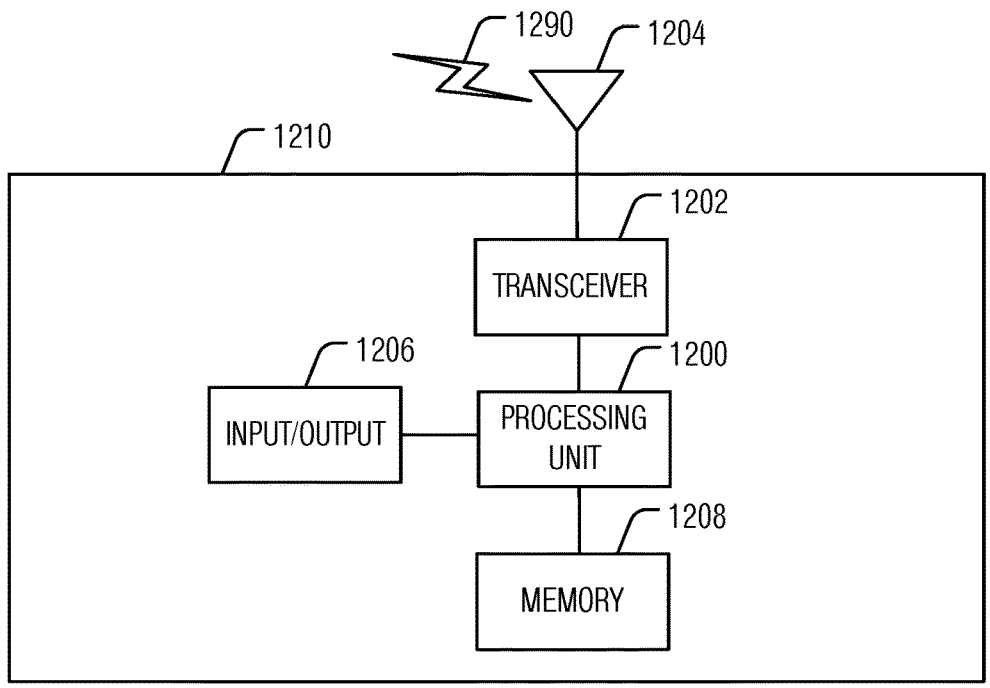
FIGS. 12A and 12B illustrate example devices that may implement the methods and teachings according to this disclosure.
Figure 12B:
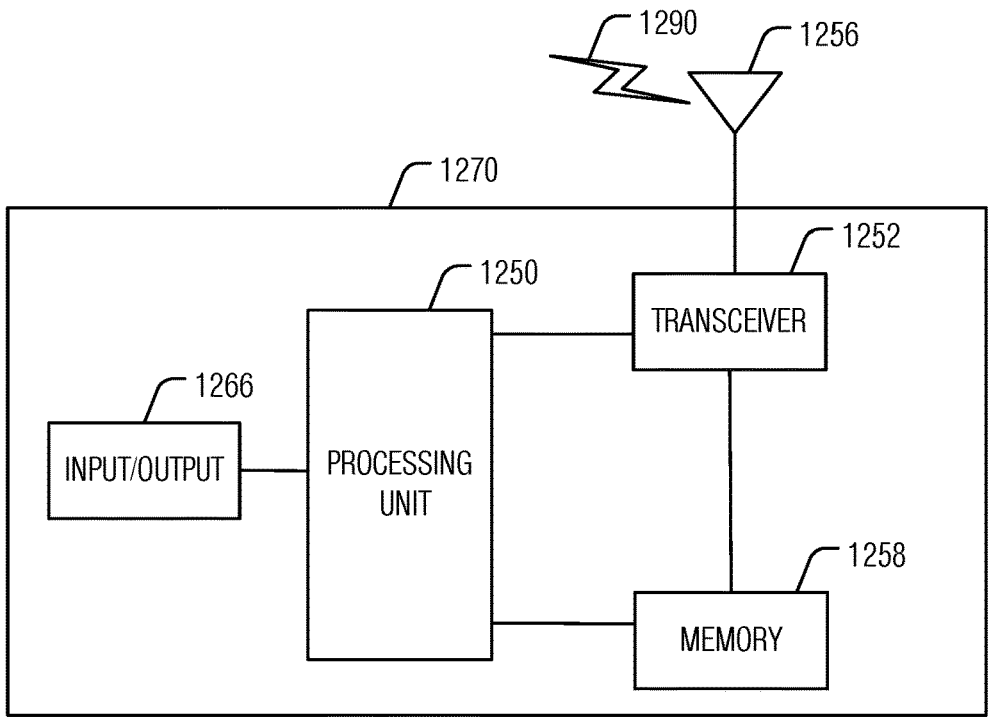

FIGS. 12A and 12B illustrate example devices that may implement the methods and teachings according to this disclosure. In particular, FIG. 12A illustrates an example ED 1210, and FIG. 12B illustrates an example base station 1270. These components could be used in the system 1100 or in any other suitable system.

As shown in FIG. 12A, the ED 1210 includes at least one processing unit 1200. The processing unit 1200 implements various processing operations of the ED 1210. For example, the processing unit 1200 could perform signal coding, data processing, power control, input/output processing, or any other functionality enabling the ED 1210 to operate in the system 1100. The processing unit 1200 also supports the methods and teachings described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

The ED 1210 also includes at least one transceiver 1202. The transceiver 1202 is configured to modulate data or other content for transmission by at least one antenna or NIC (Network Interface Controller) 1204. The transceiver 1202 is also configured to demodulate data or other content received by the at least one antenna 1204. Each transceiver 1202 includes any suitable structure for generating signals for wireless or wired transmission or processing signals received wirelessly or by wire. Each antenna 1204 includes any suitable structure for transmitting or receiving wireless or wired signals. One or multiple transceivers 1202 could be used in the ED 1210, and one or multiple antennas 1204 could be used in the ED 1210. Although shown as a single functional unit, a transceiver 1202 could also be implemented using at least one transmitter and at least one separate receiver.

The ED 1210 further includes one or more input/output devices 1206 or interfaces (such as a wired interface to the Internet 1150). The input/output devices 1206 facilitate interaction with a user or other devices (network communications) in the network. Each input/output device 1206 includes any suitable structure for providing information to or receiving information from a user, such as a speaker, microphone, keypad, keyboard, display, or touch screen, including network interface communications.

In addition, the ED 1210 includes at least one memory 1208. The memory 1208 stores instructions and data used, generated, or collected by the ED 1210. For example, the memory 1208 could store software or firmware instructions executed by the processing unit(s) 1200 and data used to reduce or eliminate interference in incoming signals. Each memory 1208 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 12B, the base station 1270 includes at least one processing unit 1250, at least one transceiver 1252, which includes functionality for a transmitter and a receiver, one or more antennas 1256, at least one memory 1258, and one or more input/output devices or interfaces 1266. A scheduler, which would be understood by one skilled in the art, is coupled to the processing unit 1250. The scheduler could be included within or operated separately from the base station 1270. The processing unit 1250 implements various processing operations of the base station 1270, such as signal coding, data processing, power control, input/output processing, or any other functionality. The processing unit 1250 can also support the methods and teachings described in more detail above. Each processing unit 1250 includes any suitable processing or computing device configured to perform one or more operations. Each processing unit 1250 could, for example, include a microprocessor, microcontroller, digital signal processor, field programmable gate array, or application specific integrated circuit.

Each transceiver 1252 includes any suitable structure for generating signals for wireless or wired transmission to one or more EDs or other devices. Each transceiver 1252 further includes any suitable structure for processing signals received wirelessly or by wire from one or more EDs or other devices. Although shown combined as a transceiver 1252, a transmitter and a receiver could be separate components. Each antenna 1256 includes any suitable structure for transmitting or receiving wireless or wired signals. While a common antenna 1256 is shown here as being coupled to the transceiver 1252, one or more antennas 1256 could be coupled to the transceiver(s) 1252, allowing separate antennas 1256 to be coupled to the transmitter and the receiver if equipped as separate components. Each memory 1258 includes any suitable volatile or non-volatile storage and retrieval device(s). Each input/output device 1266 facilitates interaction with a user or other devices (network communications) in the network. Each input/output device 1266 includes any suitable structure for providing information to or receiving/providing information from a user, including network interface communications.

Figure 13:
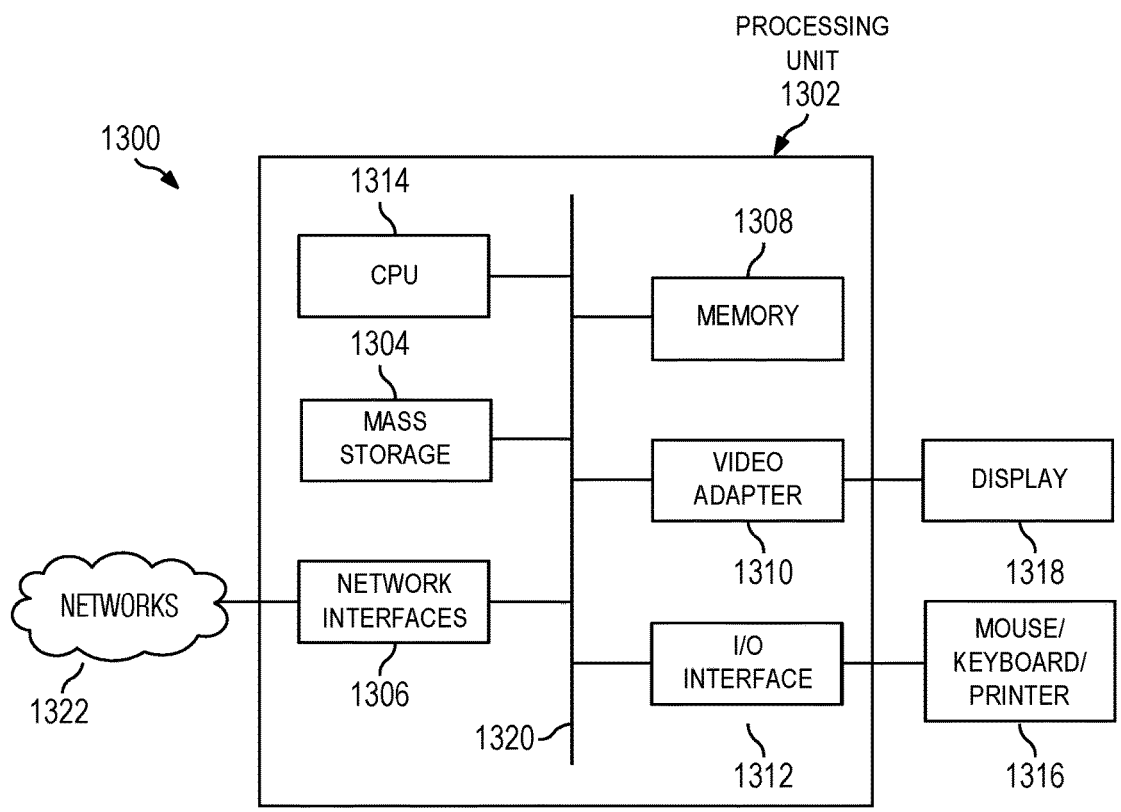
FIG. 13 is a block diagram of a computing system that may be used for implementing the devices and methods disclosed herein.

FIG. 13 is a block diagram of a computing system 1300 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1300 includes a processing unit 1302. The processing unit includes a central processing unit (CPU) 1314, memory 1308, and may further include a mass storage device 1304, a video adapter 1310, and an I/O interface 1312 connected to a bus 1320.

The bus 1320 may be one or more of any type of several bus architectures including a memory bus or memory controller, a peripheral bus, or a video bus. The CPU 1314 may comprise any type of electronic data processor. The memory 1308 may comprise any type of non-transitory system memory such as static random access memory (SRAM), dynamic random access memory (DRAM), synchronous DRAM (SDRAM), read-only memory (ROM), or a combination thereof. In an embodiment, the memory 1308 may include ROM for use at boot-up, and DRAM for program and data storage for use while executing programs.

The mass storage 1304 may comprise any type of non-transitory storage device configured to store data, programs, and other information and to make the data, programs, and other information accessible via the bus 1320. The mass storage 1304 may comprise, for example, one or more of a solid state drive, hard disk drive, a magnetic disk drive, or an optical disk drive.

The video adapter 1310 and the I/O interface 1312 provide interfaces to couple external input and output devices to the processing unit 1302. As illustrated, examples of input and output devices include a display 1318 coupled to the video adapter 1310 and a mouse, keyboard, or printer 1316 coupled to the I/O interface 1312. Other devices may be coupled to the processing unit 1302, and additional or fewer interface cards may be utilized. For example, a serial interface such as Universal Serial Bus (USB) (not shown) may be used to provide an interface for an external device.

The processing unit 1302 also includes one or more network interfaces 1306, which may comprise wired links, such as an Ethernet cable, or wireless links to access nodes or different networks. The network interfaces 1306 allow the processing unit 1302 to communicate with remote units via the networks. For example, the network interfaces 1306 may provide wireless communication via one or more transmitters/transmit antennas and one or more receivers/receive antennas. In an embodiment, the processing unit 1302 is coupled to a local-area network 1322 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an indicating unit or module, a configuring unit or module, a communicating unit or module, a monitoring unit or module, a determining unit or module, or a negotiating unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A computer-implemented method for operating an access node, comprising:
   receiving, by the access node from a user equipment (UE), information on a maximum number of multiple input multiple output (MIMO) layers supported by the UE for an operation bandwidth within a system bandwidth operated by the access node, the operation bandwidth being less than the system bandwidth;
   scheduling, by the access node for the UE, a bandwidth for data communications in accordance with the maximum number of MIMO layers supported by the UE;
   sending, by the access node to the UE, allocation information related to the bandwidth; and
   communicating, by the access node with the UE, a data frame on the bandwidth.

2. The computer-implemented method of claim 1, further comprising:
   negotiating, by the access node with the UE, to determine the maximum number of MIMO layers supported by the UE for the operation bandwidth.

3. The computer-implemented method of claim 1, wherein the operation bandwidth comprises one of a bandwidth part (BWP) or a component carrier.

4. The computer-implemented method of claim 1, further comprising:
   configuring, by the access node, a first maximum number of MIMO layers for the operation bandwidth in accordance with the maximum number of MIMO layers supported by the UE for the operation bandwidth.

5. The computer-implemented method of claim 4, wherein the first maximum number of MIMO layers for the operation bandwidth is less than or equal to the maximum number of MIMO layers supported by the UE for the operation bandwidth.

6. A computer-implemented method for operating a user equipment (UE), comprising:
   receiving, by the UE from an access node, an allocation information for a first bandwidth;
   configuring, by the UE, radio frequency (RF) chains of the UE in accordance with the first bandwidth, a second bandwidth supported by each RF chain, a maximum number of multiple input multiple output (MIMO) layers supported by the UE for a first operation bandwidth within a system bandwidth where the access node operates, and the first operation bandwidth; and
   communicating, by the UE with the access node, a data frame on the first bandwidth using the configured RF chains.

7. The computer-implemented method of claim 6, further comprising:
   indicating, by the UE, first information on the maximum number of MIMO layers supported by the UE for the first operation bandwidth.

8. The computer-implemented method of claim 7, wherein the indicating the first information comprises:
   negotiating, by the UE, with the access node to determine the maximum number of MIMO layers.

9. The computer-implemented method of claim 6, wherein the configuring the RF chains comprises:
   determining, by the UE, that the first bandwidth is less than or equal to the second bandwidth, and based thereon,
   configuring at least two RF chains with a single center frequency, with each RF chain spanning the first bandwidth.

10. The computer-implemented method of claim 6, wherein the configuring the RF chains comprises:
    determining, by the UE, that the first bandwidth is greater than the second bandwidth, and based thereon,
    configuring at least two RF chains with different center frequencies, wherein a combined bandwidth of the at least two RF chains spans the first bandwidth.

11. The computer-implemented method of claim 6, wherein the configuring the RF chains comprises:
    determining, by the UE, that the second bandwidth is less than the first operation bandwidth, and based thereon, configuring at least two RF chains with different center frequencies, wherein a combined bandwidth of the at least two RF chains spans the first operation bandwidth.

12. The computer-implemented method of claim 6, further comprising:
indicating, by the UE, that a second maximum number of MIMO layers for a second operation bandwidth is equal to one.

13. The computer-implemented method of claim 12, wherein the configuring the RF chains comprises:
determining, by the UE, that the first operation bandwidth and the second operation bandwidth are the same, and based thereon,
configuring, by the UE, one RF chain.

14. The computer-implemented method of claim 13, further comprising:
monitoring, by the UE, for a control channel in the second operation bandwidth using the one RF chain.

15. The computer-implemented method of claim 12, wherein the configuring the RF chains comprises:
determining, by the UE, that the first operation bandwidth and the second operation bandwidth are different operation bandwidths, and based thereon,
configuring the RF chains in accordance with the first bandwidth, the second bandwidth, the second operation bandwidth, and the maximum number of MIMO layers.

16. The computer-implemented method of claim 12, wherein the indicating the second maximum number of MIMO layers for the second operation bandwidth comprises:
negotiating, by the UE, with the access node to schedule only single MIMO layer communications in the first operation bandwidth.

17. An access node comprising:
a non-transitory memory storage comprising instructions; and
one or more processors in communication with the non-transitory memory storage, wherein the one or more processors execute the instructions to cause the access node to perform operations including:
receiving, from a user equipment (UE), information on a maximum number of multiple input multiple output (MIMO) layers supported by the UE for an operation bandwidth within a system bandwidth operated by the access node, the operation bandwidth being less than the system bandwidth,
scheduling, for the UE, a bandwidth for data communications in accordance with the maximum number of MIMO layers supported by the UE,
sending, to the UE, allocation information related to the bandwidth, and
communicating, with the UE, a data frame on the bandwidth.

18. The access node of claim 17, the operations further comprising:
negotiating with the UE to determine the maximum number of MIMO layers supported by the UE for the operation bandwidth.

19. The access node of claim 17, wherein the operation bandwidth comprises one of a bandwidth part (BWP) or a component carrier.

20. The access node of claim 17, the operations further comprising:
configuring a first maximum number of MIMO layers for the operation bandwidth in accordance with the maximum number of MIMO layers supported by the UE for the operation bandwidth.

21. The access node of claim 20, wherein the first maximum number of MIMO layers for the operation bandwidth is less than or equal to the maximum number of MIMO layers supported by the UE for the operation bandwidth.

22. A user equipment (UE) comprising:
a non-transitory memory storage comprising instructions; and
one or more processors in communication with the non-transitory memory storage, wherein the one or more processors execute the instructions to cause the UE to perform operations including:
receiving, from an access node, an allocation information for a first bandwidth,
configuring radio frequency (RF) chains of the UE in accordance with the first bandwidth, a second bandwidth supported by each RF chain, a maximum number of multiple input multiple output (MIMO) layers supported by the UE for a first operation bandwidth within a system bandwidth where the access node operates, and the first operation bandwidth, and
communicating, with the access node, a data frame on the first bandwidth using the configured RF chains.

23. The UE of claim 22, the operations further comprising:
indicating first information on the maximum number of MIMO layers supported by the UE for the first operation bandwidth.

24. The UE of claim 23, wherein the indicating the first information comprises:
negotiating with the access node to determine the maximum number of MIMO layers.

25. The UE of claim 22, wherein the configuring the RF chains comprises:
determining that the first bandwidth is less than or equal to the second bandwidth, and based thereon,
configuring at least two RF chains with a single center frequency, with each RF chain spanning the first bandwidth.

26. The UE of claim 22, wherein the configuring the RF chains comprises:
determining that the first bandwidth is greater than the second bandwidth, and based thereon,
configuring at least two RF chains with different center frequencies, wherein a combined bandwidth of the at least two RF chains spans the first bandwidth.

27. The UE of claim 22, wherein the configuring the RF chains comprises:
determining that the second bandwidth is less than the first operation bandwidth, and based thereon,
configuring at least two RF chains with different center frequencies, wherein a combined bandwidth of the at least two RF chains spans the first operation bandwidth.

28. The UE of claim 22, the operations further comprising:
indicating that a second maximum number of MIMO layers for a second operation bandwidth is equal to one.

29. The UE of claim 22, wherein the configuring the RF chains comprises:
determining that the first operation bandwidth and the second operation bandwidth are the same, and based thereon,
configuring one RF chain.

30. The UE of claim 29, the operations further comprising:
monitoring for a control channel in the second operation bandwidth using the one RF chain.

31. The UE of claim 28, wherein the configuring the RF chains comprises:
 determining that the first operation bandwidth and the second operation bandwidth are different operation bandwidths, and based thereon,
 configuring the RF chains in accordance with the first bandwidth, the second bandwidth, the second operation bandwidth, and the maximum number of MIMO layers.

32. The UE of claim 28, wherein the indicating the second maximum number of MIMO layers for the second operation bandwidth comprises:
 negotiating with the access node to schedule only single MIMO layer communications in the first operation bandwidth.

* * * * *